Patented Sept. 27, 1949

2,483,201

UNITED STATES PATENT OFFICE 2,483,201

PROCESS FOR THE SELECTIVE HYDROGENATION OF ARYLNITROOLEFINS AND PRODUCTS THEREOF

Charles D. Hurd, Evanston, Ill., assignor to Commercial Solvents Corporation, Terre Haute, Ind., a corporation of Maryland No Drawing. Application June 20, 1945, Serial No. 600,654

5 Claims. (Cl. 260—566)

This invention relates to a new method for selectively hydrogenating 1-aryl-2-nitro-1-alkenes to obtain substantial yields of 1-aryl-2-nitroalkanes virtually free of amines.

Arylnitroolefins have been hydrogenated in the past to form aryloxoalkane oximes, mixtures of aryloxoalkanes and arylaminoalkanes or mixtures of all three of these compounds.

In the prior processes described above, it was the ultimate objective to obtain the arylaminoalkanes. This was accomplished in the case of the oxime by reduction in alcoholic oxalic acid solution in the presence of a platinum catalyst. But yields were low, and the process was so expensive as to be unsatisfactory. In the cases where mixtures of oxime and ketone or aldehyde are to be further reduced to the amine, there is a tendency for the amines and ketones to combine making ultimate separation difficult. This is likewise the case where amines and carbonyl compounds are formed together in the initial reduction process.

Certain other investigators have attempted to produce the 1-aryl-2-nitroalkanes by the hydrogenation of the 1-aryl-2-nitro-1-alkenes but have been unsuccessful in isolating any of the 1-aryl-2-nitroalkane.

I have now found that 1-aryl-2-nitro-1-alkenes can be selectively hydrogenated to produce substantial yields of 1-aryl-2-nitroalkanes, virtually free of amines, together with quantities of 1-aryl-2-oxoalkane oximes and 1-aryl-2-oxoalkanes. By my process, catalytic reduction of the 1-aryl-2-nitroalkene is carried out under controlled, neutral, low temperature conditions in the presence of a platinum or a palladium catalyst.

The 1-aryl-2-nitroalkanes obtained in accordance with my invention may be used directly in the preparation of 1-aryl-2-aminoalkanes by reduction of the nitro group or they may be converted to the corresponding 1-aryl-2-oxoalkane as described in copending application of John B. Tindall, Serial No. 600,653, now Patent No. 2,427,822, filed as of even date herewith; or they may be used to prepare new nitro alcohols by reaction with an aldehyde and these nitro alcohols in turn may be converted into the corresponding amino alcohols. These compounds have valuable physiological properties, having the structural configuration which imparts to "benzedrine," desoxyephedrine and the like their physiological effectiveness.

The 1-aryl-2-nitro-1-alkenes which serve as starting materials in my process may be illustrated by the following structural formula

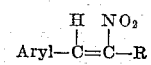

wherein R may be an alkyl radical.

Upon hydrogenation, substantial yields of 1-aryl-2-nitroalkanes are obtained represented by the formula

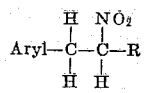

along with usually somewhat lesser quantities of the aryloxoalkanes and aryloxoalkane oximes.

In carrying out my invention, the 1-aryl-2-nitro-1-alkene, together with an inert, neutral solvent and a small quantity of platinum or palladium catalyst is placed in a pressure vessel. The vessel is closed, heated and hydrogen is passed into the vessel under pressure until hydrogen absorption appears substantially to cease. The hydrogenation products are then separated from the catalyst and the inert solvent is removed. The hydrogenation products may then be separated if desired by suitable means as by fractionation.

As a liquid reaction medium, any suitable inert, neutral solvent may be used such as water, alcohols, ketones, benzene, toluene and the like.

The temperature of hydrogenation should be as low as is consistent with adequate hydrogen absorption as higher temperatures appear to promote formation of some quantities of undesired amines which tend not only to lower the yields of 1-aryl-2-nitroalkane and the accompanying oxime and carbonyl compounds, but also to combine with them in such a way as to make separation by fractionation difficult. A temperature of at least about 15° C. is necessary for reasonably rapid hydrogenation, and up to about 40° C. may generally be used before the undesired, interfering amine begins to form. I therefore prefer to carry out my hydrogenation between these two temperature limits of about 15° C. to 40° C. to obtain high yields of 1-aryl-2-nitroalkanes as well as high overall yields of combined products in the form of arylnitroalkanes, aryloxoalkanes and aryloxoalkane oximes, and temperatures between about 18° and 30° C. are usually preferred.

The hydrogenation is carried out under pressures, and this factor is not particularly critical, pressures between 15 and 500 lbs./sq. inch being suitable and pressures between 200 and 500 lbs./sq. inch being most satisfactory for palladium catalyst while somewhat lower pressures in the range between 15 and 100 lbs./sq. inch are most satisfactory for platinum catalyst.

The yields of arylnitroalkanes are substantial, ranging from about 25% to over 60% depending somewhat on the 1-aryl-2-nitro-1-alkene used as starting material, and the solvent employed as a reaction medium. The overall yields of the three products obtained are usually high, ranging from about 70 to 90%.

The products of my invention may be recovered severally in the usual way by fractionation or the like since no interfering amines are present to complicate the recovery.

The following specific examples will further illustrate my invention.

EXAMPLE I

A mixture of 200 parts of 1-phenyl-2-nitro-1-propene, 600 parts of water and 2 parts of 5% palladium on charcoal was placed in a pressure vessel. The vessel was closed, and hydrogen was passed in at a temperature between 31 and 35° C. and at 500 lbs. pressure until hydrogen absorption ceased. The hydrogen absorption was 1.38 moles per mole of 1-phenyl-2-nitro-1-propene. The vessel was then opened, and the catalyst filtered from the reaction mass. The residue consisted of an upper water layer and a lower oil layer. The oil layer amounted to 180.5 parts and was neutral to methyl red. The water layer was extracted with benzene and the benzene and oil layers were fractionated. After removal of benzene and water the following fractions were obtained at 1 mm. pressure.

| Fraction | Boiling Range | Parts | Product | Yield |
|---|---|---|---|---|
| | Degrees | | | Percent |
| 1 | 65–80 | 8.0 | Phenylacetone | 4.9 |
| 2 | 80–95 | 127.5 | 1-Phenyl-2-nitropropane | 63.0 |
| 3 | 95–110 | 31.9 | Phenylacetone oxime | 17.3 |
| Residue | | 10.0 | solid tar | |

EXAMPLE II

A mixture of 168 parts of 2-nitro-1-(m-tolyl)-1-propene, 600 parts of methanol and 3 parts of 5% palladium on charcoal was hydrogenated at 300 lbs. hydrogen pressure and at 20–21° C. The product from the bomb was filtered. It was treated with equivalent HCl and 100 parts of water and distilled through a column until free from methanol. The layers in the residue were separated and the oil layer was distilled from a Claisen flask. At 1 mm. pressure 119 parts of distillate was obtained at 86–98° C. This distillate was fractionated through a column at 1 mm., the following fractions being collected.

| | Parts |
|---|---|
| 1. 70–90° | 16.2 |
| 2. 90–95° | 71.8 |
| 3. 95–110° | 15.1 |
| Residue | 3.6 |

Fraction 2, consisting of 2-nitro-1-(m-tolyl)-propane contained 7.65% N (theo. 7.82%) and had a refractive index $n_D^{20}=1.519$. The yield of phenylnitroalkane was 40.5%, the total yield of products 61.8%.

EXAMPLE III

A mixture of 142.7 parts of 2-nitro-1-(p-isopropylphenyl)-1-propene, 500 parts of methanol and 3 parts of 5% palladium on charcoal was hydrogenated at 18–20° C. and at 300 lbs. pressure. The product was distilled until free from methanol then distillation was continued at a pressure of 1 mm. Eighty-five grams of distillate were obtained at 95–110° (1 mm.). The product, 2-nitro-1-(p-isopropylphenyl)-propane was obtained in a yield of 59.0% and had the following analysis:

Nitrogen, 6.52% (theo. 6.77%)
Refractive index, $n_D^{20}=1.5109$
Specific gravity, 20/20° C., 1.025

Using the general procedure described in Example I, 1-phenyl-2-nitro-1-propene, 1-phenyl-2-nitro-1-butene and 1-phenyl-2-nitro-1-pentene were hydrogenated under the conditions and with the results indicated in Table I.

TABLE I
*Reduction of nitroolefins*

| Nitroolefin | Solvent | Temp., °C. | Pressure, lb/in.² | Yield, percent | | | |
|---|---|---|---|---|---|---|---|
| | | | | Ketone | Aryl Nitroalkane | Oxime | Total |
| 1-Phenyl-2-nitro-1-propene | Water | 31–35 | 500 | 4.9 | 63.0 | 17.3 | 85.2 |
| Do | Methanol | 26–34 | 400–500 | 10.5 | 56.2 | 20.9 | 87.6 |
| Do | Acetone | 30–35 | 200 | 6.8 | 43.0 | 41.0 | 90.8 |
| Do | Toluene | 25–35 | 200 | 5.3 | 30.8 | 42.0 | 78.1 |
| 1-Phenyl-2-nitro-1-butene | Methanol | 30–38 | 400–500 | 17.3 | 45.6 | 13.2 | 76.1 |
| Do | Water | 25–30 | 500 | 9.7 | 58.2 | 11.0 | 78.9 |
| 1-Phenyl-2-nitro-1-pentene | Methanol | 29–36 | 200–500 | 8.0 | 29.5 | 35.0 | 72.5 |
| 2-Nitro-1-(m-tolyl)-1-propene | do | 20–21 | 300 | 11.5 | 40.5 | 9.8 | 61.8 |
| 2-Nitro-1-(p-isopropylphenyl)-1-propene | do | 18–20 | 300 | | 59.0 | | |

EXAMPLE IV

A mixture of 16.9 parts of 1-phenyl-2-nitro-1-propene, 140 parts of acetone, and 0.15 part of platinum oxide catalyst was hydrogenated at 20–30° and at 45 lb. pressure. Then the catalyst was filtered off, the solvent evaporated, and the reaction product distilled. Five parts of 1-phenyl-2-nitropropane was collected at 126–128° (12 mm.), and an equal weight of 1-phenyl-2-nitro-1-propene (M. P. 63°) was recovered at 132–135° (12 mm.). This represents a 44% yield of phenylnitropropane, based on the consumed nitroolefin. A dark colored residue remained in the distilling flask.

The phenylnitropropane was soluble in dilute sodium hydroxide solution, and with nitrous acid it gave rise to the characteristic blue colored pseudo nitrole.

Some of the properties of the phenylnitroalkanes are listed in Table II below.

TABLE II
*Properties of arylnitroalkanes*

| Compound | Boiling Range, °C. | Pressure, mm. Hg. | Refractive Index, $n_D^{20}$ | Specific Gravity, 20°/20° C. | Nitrogen Found | Nitrogen Calculated |
|---|---|---|---|---|---|---|
| 1-Phenyl-2-nitropropane | 78–79 | 1 | 1.520 | 1.087 | 8.54 | 8.50 |
| 1-Phenyl-2-nitrobutane | 92–94 | 1 | 1.517 | 1.059 | 7.98 | 7.83 |
| 1-Phenyl-2-nitropentane | 95–97 | 1 | 1.511 | 1.043 | 7.28 | 7.26 |
| 2-Nitro-1-(m-tolyl)-propane | 90–95 | 1 | 1.519 | | 7.65 | 7.82 |
| 2-Nitro-1-(p-isopropylphenyl)-propane | 99–103 | 1 | 1.5109 | 1.025 | 6.25 | 6.77 |

While the above describes the preferred embodiments of my invention, it will be understood that modifications may be made therein and departures therefrom within the scope of the specification and claims.

What is claimed is:

1. A process for the selective hydrogenation of arylnitroolefins of the general formula

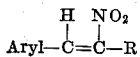

wherein R is an alkyl group, to obtain a composite reaction product comprising a mixture of 1-aryl-2-nitroalkanes; 1-aryl-2-oxoalkanes and 1-aryl-2-oxoalkane oximes; which comprises subjecting said arylnitroolefin to catalytic hydrogenation, at pressures ranging from 45 to 500 pounds per square inch, in the liquid phase under neutral conditions at temperatures below about 40° C. and in the presence of a noble metal catalyst selected from the group consisting of platinum and palladium.

2. A process for preparing 1-aryl-2-nitroalkanes having the following general formula

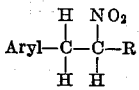

wherein R is an alkyl group, which comprises subjecting a 1-aryl-2-nitro-1-alkene having the general formula

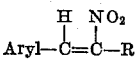

wherein R is an alkyl group to selective catalytic hydrogenation, at pressures ranging from 45 to 500 pounds per square inch, in a neutral solvent, at temperatures below about 40° C. and in the presence of a noble metal catalyst selected from the group consisting of platinum and palladium.

3. In a process for preparing 1-phenyl-2-nitropropane, the steps which comprise selectively hydrogenating, at pressures ranging from 45 to 500 pounds per square inch, 1-phenyl-2-nitro-1-propene in the liquid phase under neutral conditions at temperatures between about 15° C. and about 40° C., in the presence of a noble metal catalyst selected from the group consisting of platinum and palladium.

4. In a process for preparing 1-phenyl-2-nitrobutane, the steps which comprise selectively hydrogenating, at pressures ranging from 45 to 500 pounds per square inch, 1-phenyl-2-nitro-1-butene in the liquid phase under neutral conditions at temperatures between about 15° C. and about 40° C., in the presence of a noble metal catalyst selected from the group consisting of platinum and palladium.

5. In a process for preparing 1-phenyl-2-nitropentane, the steps which comprise selectively hydrogenating, at pressures ranging from 45 to 500 pounds per square inch, 1-phenyl-2-nitro-1-pentene in the liquid phase under neutral conditions at temperatures between about 15° C. and about 40° C., in the presence of a noble metal catalyst selected from the group consisting of platinum and palladium.

CHARLES D. HURD.

REFERENCES CITED

The following references are of record in the file of this patent:

UNITED STATES PATENTS

| Number | Name | Date |
|---|---|---|
| 2,427,822 | Tindall | Sept. 23, 1947 |

FOREIGN PATENTS

| Number | Country | Date |
|---|---|---|
| 406,149 | Germany | Nov. 14, 1924 |
| 571,794 | Germany | Mar. 15, 1933 |
| 629,313 | Germany | Apr. 30, 1936 |

OTHER REFERENCES

Sonn et al.: "Berichte," vol. 50 (1917), page 1515.

"Chemical Abstracts," vol. 12, page 40, abstract of article by Asakina.

Hass et al.: "Chemical Reviews," vol. 32 (1943), pages 412, 413.